(12) United States Patent
Bartels

(10) Patent No.: US 12,552,470 B2
(45) Date of Patent: Feb. 17, 2026

(54) MOTOR VEHICLE AND METHOD FOR CONTROLLING THE AERO BALANCE OF THE MOTOR VEHICLE

(71) Applicant: Dr. Ing. h.c. F. Porsche Aktiengesellschaft, Stuttgart (DE)

(72) Inventor: Holger Bartels, Aspach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 378 days.

(21) Appl. No.: 17/842,963

(22) Filed: Jun. 17, 2022

(65) Prior Publication Data

US 2023/0038657 A1 Feb. 9, 2023

(30) Foreign Application Priority Data

Aug. 6, 2021 (DE) ..................... 10 2021 120 488.7

(51) Int. Cl.
*B62D 37/02* (2006.01)
*B62D 35/00* (2006.01)

(52) U.S. Cl.
CPC ........... *B62D 37/02* (2013.01); *B62D 35/005* (2013.01); *B62D 35/007* (2013.01)

(58) Field of Classification Search
CPC ..... B62D 37/02; B62D 35/005; B62D 35/007
See application file for complete search history.

(56) References Cited

U.S. PATENT DOCUMENTS

| 4,810,022 A * | 3/1989 | Takagi ................. B62D 35/005 |
| | | 296/180.5 |
| 9,827,957 B2 | 11/2017 | Fahland et al. |
| 10,336,317 B2 | 7/2019 | Fahland et al. |
| 10,696,294 B2 | 6/2020 | Fahland et al. |
| 2007/0257512 A1 | 11/2007 | Anderson |
| 2017/0349167 A1 | 12/2017 | Fahland et al. |
| 2019/0100194 A1* | 4/2019 | Fahland .......... B60W 30/18109 |

(Continued)

FOREIGN PATENT DOCUMENTS

| DE | 3512378 A1 | 10/1985 | |
| DE | 102011114767 A1 * | 4/2013 | ............. B62D 35/00 |
| DE | 102016218181 A1 | 3/2017 | |

(Continued)

OTHER PUBLICATIONS

English Machine Translation DE102011114767A1 (Year: 2011).*

*Primary Examiner* — Andrew J Cromer
(74) *Attorney, Agent, or Firm* — Buchanan Ingersoll & Rooney PC

(57) ABSTRACT

A motor vehicle with an automatically adjustable front wing and with an automatically adjustable rear wing, which are each adjustable in a controlled manner by an actuator. The motor vehicle has a front axle with front wheels and a rear axle with rear wheels. By way of the adjustment of the front wing and/or the rear wing, a downforce is caused on the front axle due to the inflow of air onto the front axle, and a downforce on the rear axle is caused due to the inflow of air onto the rear axle. A resulting downforce passing through a point can be produced, and an aero balance can be adjusted. The downforce on the front axle, the downforce on the rear axle, the resulting downforce, and/or the aero balance can be controlled and/or adjusted automatically and/or manually.

18 Claims, 4 Drawing Sheets

(56) References Cited

U.S. PATENT DOCUMENTS

2019/0263458 A1    8/2019  Fahland et al.

FOREIGN PATENT DOCUMENTS

| | | |
|---|---|---|
| DE | 102017112290 A1 | 12/2017 |
| DE | 102017116389 A1 | 1/2018 |
| DE | 102018123834 A1 | 4/2019 |
| DE | 102019104739 A1 | 8/2019 |
| IN | 201811038343 A  * | 4/2020 |

* cited by examiner

MOTOR VEHICLE AND METHOD FOR CONTROLLING THE AERO BALANCE OF THE MOTOR VEHICLE

CROSS-REFERENCE TO RELATED APPLICATION

This application claims priority to German Patent Application No. 10 2021 120 488.7, filed Aug. 6, 2021, the content of such application being incorporated by reference herein in its entirety.

FIELD OF THE INVENTION

The invention relates to a motor vehicle and a method for controlling the aero balance of the motor vehicle.

SUMMARY OF THE INVENTION

Motor vehicles having a front wing and a rear wing are known in the prior art. Motor vehicles having an adjustable front wing and an adjustable rear wing are also known in the prior art. Due to the inflow of air onto the front axle, a downforce is caused on said front axle FDF, and due to the inflow of air onto the rear axle, a downforce is caused on said rear axle RDF, by the front wing and by the rear wing. In this way, a CoP point can be defined, through which a resulting downforce DF=(FDF+RDF) passes. Moreover, the aero balance AB can be determined as FDF/DF*100%.

The aero balance in this case depends on the adjustment of the front wing and also on the adjustment of the rear wing. The driving properties of the motor vehicle in this case also depend on the aero balance. For example, vehicle understeer or vehicle oversteer also depends on the aero balance. A customary value for the aero balance in the case of GT road vehicles is 35%, for example.

In the case of motor vehicles, it is known in the art, for example, for the rear wing to be adjustable when the motor vehicle is being driven, in order to reduce air resistance, so that the vehicle is able to reach a higher final speed. In different operating situations or driving states, an unfavorable aero balance, and therefore critical handling behavior, may exist if the downforce and the aero balance are neglected.

The problem addressed by the present invention is that of creating a motor vehicle, and a method for controlling the aero balance of the motor vehicle, which is improved by comparison with the prior art.

An exemplary embodiment of the invention relates to a motor vehicle having a front wing that can be automatically adjusted and having a rear wing that can be automatically adjusted, each of said wings being adjustably controlled by an actuator, wherein the motor vehicle has a front axle with front wheels and a rear axle with rear wheels, wherein by means of the adjustment of the front wing and/or by means of the adjustment of the rear wing, due to the inflow of air onto the front axle, a downforce on said front axle (FDF), and due to the inflow of air onto the rear axle, a downforce on said rear axle (RDF), can be adjusted, wherein a resulting downforce DF=(FDF+RDF) passing through a point CoP can be produced and an aero balance (AB) can be adjusted as AB=FDF/DF*100%, wherein the downforce on the front axle (FDF), the downforce on the rear axle (RDF), the resulting downforce (DF), and/or the aero balance (AB) can be controlled and/or adjusted automatically and/or manually. In this way, the aero balance (AB) and the downforce, in particular, for example, the downforce on the front axle (FDF), the downforce on the rear axle (RDF) and/or the resulting downforce (DF), can be controlled and/or regulated automatically in accordance with a recognized vehicle state, for example, so as to allow, with regard to present driving states, an aero balance and/or an optimized downforce which is adapted and, in particular, optimized in each case. The aero balance and/or the downforce in this case can be selected on the basis of stored databases, functions, tables and/or matrixes, for example, in which previously tested adjustments can be stored depending on the driving state. A manual adjustment and/or change in the downforce and/or aero balance can also be undertaken when desired, in order to allow the driver to have greater influence on these influencing variables.

It is also advantageous for the downforce on the front axle (FDF), the downforce on the rear axle (RDF), the resulting downforce (DF) and/or the aero balance (AB) to be automatically adjustable, depending on the dynamic driving state of the motor vehicle. A control unit can therefore identify the current dynamic driving state utilizing vehicle data, dynamic driving data, and/or sensor data, and perform a corresponding control of the actuators to adjust rear wings and front wings.

In the case of an exemplary embodiment, it is also advantageous for automatic adjustability of the downforce on the front axle (FDF), the downforce on the rear axle (RDF), the resulting downforce (DF), and/or the aero balance (AB) to be capable of being switched on manually or automatically, switched off manually or automatically, and/or manually overwritten at least temporarily. Consequently, the driver of the motor vehicle can change, switch on, switch off, or disable only temporarily, and even overwrite, for example, the automatic actuation of the downforce and/or of the air balance. The automatic actuation can also be switched on in a preset manner, for example in a predefined driving mode, such as in sports mode or racing mode, etc., for example. In this mode, the automatic actuation can be switched off or changed manually. In normal mode, eco-mode, or similar, for example, the automated actuation can also be switched off in a preset manner and it can be switched on manually. The manual adjustment of the downforce and/or the aero balance can also be undertaken in a corresponding mode. In this case, the manual change of the downforce and/or the aero balance may depend on a predefined driving situation, for example, which does not become a problematic driving situation following a manual change in downforce and/or aero balance.

With a further exemplary embodiment, it is also advantageous for the ability to manually overwrite the adjustability of the downforce on the front axle (FDF), the downforce on the rear axle (RDF), the resulting downforce (DF), and/or the aero balance (AB), only to be allowed in first predefined dynamic driving states and/or prohibited in second predefined dynamic driving states. Manual intervention can therefore only be allowed when it can be predicted that the intervention will not lead to a problematic driving state, otherwise the manual intervention can also be prohibited.

It is also particularly advantageous for the resulting downforce (DF) and/or the aero balance (AB) to be adjustable, depending on at least one pitch angle, roll angle and/or yaw angle of the vehicle body and/or at least one pitch force, roll force and/or yaw force. In this way, a connection can be made between pitch, roll and/or yaw, for example, and the aerodynamic balance shift recorded in a characteristic diagram, so that with a braking and/or starting performance of the motor vehicle, on account of an introduction of force to the wheels, the aerodynamic balance shift, in other words the change in the aero balance, is compensated for.

It is also advantageous for the resulting downforce (DF) to be adjustable depending on at least one lateral acceleration of the motor vehicle, wherein particularly with a lateral acceleration which is smaller than a predefined limit value, the downforce is limited to a predefined value. It is thereby achieved that the maximum downforce only exists, for example, when it is also needed. This prevents tire damage, for example, when the downforce in driving situations where there is no need for maximum downforce is also reduced.

An exemplary embodiment of the invention relates to a method for controlling the aero balance (AB) and/or a resulting downforce (DF) of a motor vehicle with an automatically adjustable front wing and with an automatically adjustable rear wing, which are each adjustable in a controlled manner by an actuator, wherein the motor vehicle has a front axle with front wheels and a rear axle with rear wheels, wherein by means of the adjustment of the front wing and/or by means of the adjustment of the rear wing, due to the inflow of air onto the front axle, a downforce on said front axle (FDF), and due to the inflow of air onto the rear axle, a downforce on said rear axle (RDF), can be adjusted, wherein a resulting downforce DF=(FDF+RDF) passing through a point (CoP) can be produced, and an aero balance (AB) can be adjusted as AB=FDF/DF*100%, wherein the downforce on the front axle (FDF), the downforce on the rear axle (RDF), the resulting downforce (DF) and/or the aero balance (AB) is controlled and/or adjusted automatically and/or manually. In this way, depending on the driving situation and desired driving performance, the resulting downforce and/or the aero balance can be adjusted in the desired manner, so as to produce as little air resistance as possible on a straight line, for example, so that the maximum speed is not negatively affected and the best possible downforce is obtained when cornering, so that the lateral forces which occur when cornering can be effectively transmitted, enabling high cornering speeds to be achieved.

It is particularly appropriate in the case of an exemplary embodiment for the downforce on the front axle (FDF), the downforce on the rear axle (RDF), the resulting downforce (DF), and/or the aero balance (AB) to be controlled automatically, depending on the dynamic driving state of the motor vehicle. In this way, the respective downforce and/or the aero balance can be adjusted without the driver's involvement, based on vehicle data which characterize the dynamic driving state, so that the driver is provided with optimized driving performance at all times, in particular observing the necessary safety reserves.

It is also advantageous for the automated adjustability of the downforce on the front axle (FDF), the downforce on the rear axle (RDF), the resulting downforce (DF), and/or the aero balance (AB) to be capable of being switched on manually or automatically, switched off manually or automatically, and/or manually overwritten at least temporarily. In this way, the driver of the motor vehicle can also manually intervene in the vehicle controls, in addition to the automatic controls, if he regards this as advantageous, so that the automatic control can be ended or interrupted, in order to make manual inputs.

It is also advantageous for the ability to manually overwrite the adjustability of the downforce on the front axle (FDF), the downforce on the rear axle (RDF), the resulting downforce (DF), and/or the aero balance (AB) only to be allowed in first predefined dynamic driving states and/or prohibited in second predefined dynamic driving states. It is thereby achieved that the manual overruling of the automatic controls is only possible in defined driving states, or is even prohibited in defined driving states, in order to avoid a critical driving state. This may, for example, be prohibited in a driving state, if a high downforce is required and the driver would like to reduce the existing high downforce manually, for example, so as to reduce the air resistance associated with the high downforce. If the reduction in downforce were to be allowed in this situation, the force transmission of the lateral forces to the wheels could drop off spontaneously, and a loss of adhesion could result from this, which could lead to an accident.

It is also advantageous for the resulting downforce (DF) and/or the aero balance (AB) to be adjustable depending on at least one pitch angle, roll angle and/or yaw angle of the vehicle body and/or at least one pitch force, roll force and/or yaw force. In this way, the control of the resulting downforce (DF) and/or the aero balance (AB) may depend on a defined and measurable driving state, such as an angle of this kind.

It is also advantageous for the resulting downforce (DF) to be adjustable depending on at least one lateral acceleration of the motor vehicle, wherein particularly with a lateral acceleration which is smaller than a predefined limit value, the downforce is limited to a predefined value. In this way, with small lateral accelerations, the load on the wheels can be reduced, so that tire damage can thereby be prevented.

BRIEF DESCRIPTION OF THE DRAWINGS

The invention is explained in detail below with the help of an exemplary embodiment with reference to the drawing. In the drawing.

DETAILED DESCRIPTION OF THE INVENTION

Figure 1:
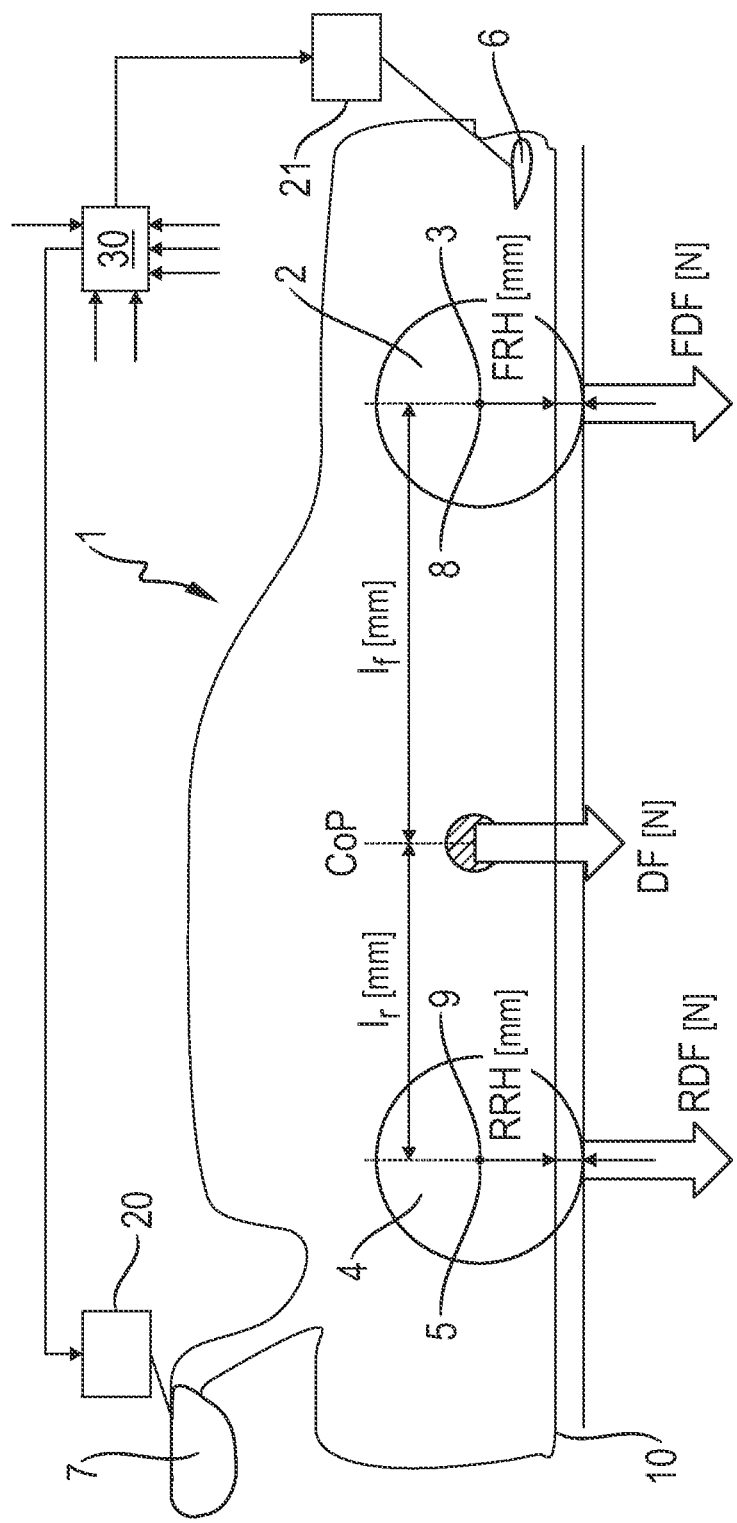
FIG. 1 shows a schematic representation of a motor vehicle for explaining the motor vehicle according to aspects of the invention and the method according to aspects of the invention.

FIG. 1 shows a schematic representation of a motor vehicle 1 with front wheels 2 on the front axle 3 and with rear wheels 4 on the rear axle 5.

The motor vehicle 1 has a front wing 6 and a rear wing 7 which are each individually adjustable. Actuators are provided for this purpose, in particular electromotive actuators, so that the front wing 6 can be adjusted by a first actuator and the rear wing 7 by a second actuator.

At least one means 8 for determining the downforce on the front axle 3 and one means 9 for determining the downforce on the rear axle 5 is also provided. These means 8, 9 are designed as force sensors on the front axle 3 and on the rear axle 5, for example.

The correlation between the downforce coefficient and the wing angle of the front wing 6 and rear wing 7 is determined by wind tunnel measurements, for example. The wing angles on the front axle 3 and on the rear axle 5 in this case are measured by sensors, for example, and reported back to the control unit 30. In this case, angle sensors can also be provided on the front wing 6 and on the rear wing 7. By means of the current driving speed of the motor vehicle 1 and the calculated downforce values, a downforce FDF on the front axle 3 and a downforce RDF on the rear axle 5 can be calculated. Alternatively, force sensors can also be used.

The force on the front axle 3 is referred to as FDF; it is a downforce. The force on the rear axle 5 is referred to as RDF; it is a downforce.

The total downforce DF emerges from this as DF=FDF+RDF and makes contact with the CoP point of the resulting total downforce DF. The CoP lies If behind the front axle 3 and Ir in front of the rear axle 5. The height of the underbody 10 at the front axle 3 is FRH and the height of the underbody 10 at the rear axle is RRH. This results in the rake as rake=RRH−FRH. A pitch angle in respect of the horizontal can be determined from this, for example. The pitch angle in this case is the inclination of the motor vehicle 1 about a lateral axis of the motor vehicle 1.

The aero balance AB results at AE=(FDF/DF)*100% where FDF=the downforce on the front axle, DF being the total downforce on the front axle FDF plus the downforce on the rear axle RDF. The aero balance AB depends on the adjustment of the front wing 6 and of the rear wing 7. If the front wing 6 and/or the rear wing 7 are misaligned, this has implications for the aero balance.

Figure 2:
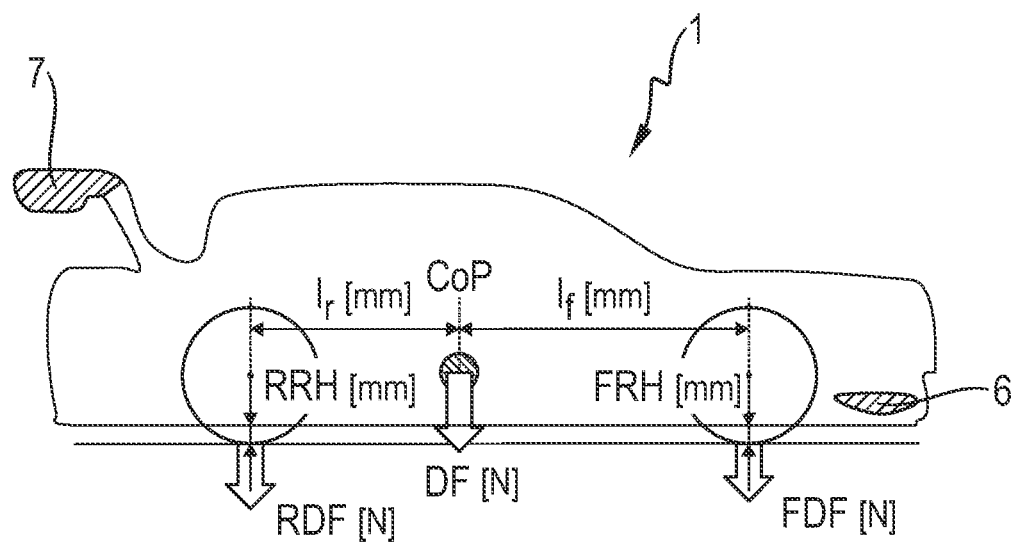
FIG. 2 shows a further schematic representation of a motor vehicle for explaining the motor vehicle according to aspects of the invention and the method according to aspects of the invention.

FIG. 2 shows an example in which the front wing 6 and the rear wing 7 are adjusted in a first operating position, in particular a first operating end position, with a low downforce—referred to as a Low Downforce (LDF) position—in which only a small downforce is produced with a small amount of air resistance. A high final speed of the motor vehicle 1 can thereby be achieved, for example.

Figure 3:
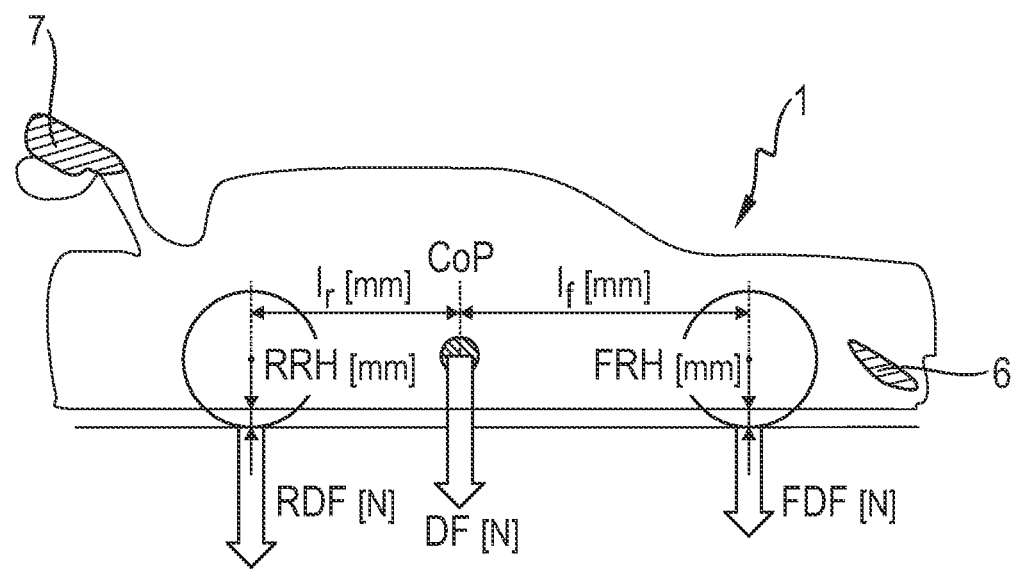
FIG. 3 shows a further schematic representation of a motor vehicle for explaining the motor vehicle according to aspects of the invention and the method according to aspects of the invention.

FIG. 3 shows an example in which the front wing 6 and the rear wing 7 are adjusted in a second operating position, in particular a second operating end position, with a high downforce—referred to as a High Downforce (HDF) position—in which a high downforce is produced. A high cornering speed can thereby be achieved, for example.

A control unit 30 (in the form of a computer processor and/or controller) is provided for controlling the actuators 20, 21, in order to adjust the front wing 6 and the rear wing 7. This control unit 30 receives a plurality of vehicle data and/or measuring data from sensors and/or other control units, generally also referred to as data 31. The control unit 30 determines the target position of the front wing 6 and of the rear wing 7 with the help of the available data 31 or input variables and can compare this target position with the actual position, in order to emit a respective triggering signal for the actuators 20, 21, so that the front wing 6 and/or the rear wing 7 are adjusted. Alternatively, the control unit 30 can define a signal for the actuators 20, 21 irrespective of the current position, said signal representing the target position, and the actuators 20, 21 then adopt the position, depending on whether the target position deviates from the actual position.

The following data are used as input variables 31, for example:

Kupp-state 35=estimation of a hump having been driven over, wherein if it is suspected that a hump has been driven over on account of the vehicle data, a corresponding bit is transmitted.

Trottle-pos 36=gas pedal position, for example in the range from 0% to 100% of the possible gas pedal activation.

VFzRef 37=a vehicle reference speed, a calculated and/or estimated and measured vehicle speed, for example from a so-called PSM, a driving dynamics control system, also referred to as ESC, Electronic Stability Control.

MueMax 40=a stored value of an estimated coefficient of friction of the coefficient of friction between wheel and road, for example from a so-called PSM, a driving dynamics control system.

Ays 38=a measured value of the lateral acceleration of the motor vehicle, processed from a so-called PSM, a driving dynamics control system, for example.

Axs 39=a measured value of the longitudinal acceleration of the motor vehicle, processed from a so-called PSM, a driving dynamics control system, for example.

MPropDrvReq 42=a calculated value of a driver's desired torque at wheel level, for example from a so-called PSM, a driving dynamics control system.

MbDrvLdmReq 43=a calculated value of a driver's braking torque at wheel level, for example from a so-called PSM, a driving dynamics control system.

SpoilerSG_Status 41=an aerodynamic mode selected by the driver manually or automatically via a driving mode.

The control unit 30 determines the following output values 32, 33 and 34 from these data, as the input values:

In this case, the output value 32 is a signal which represents the automatic mode in which the downforce is automatically adjusted. Bit 0 represents high downforce HDF and bit 1 represents low downforce LDF.

The output value 33 represents a release bit which allows or prevents a manual change to the downforce, which change is requested at the driver's end, for example, by means of a DRS button. If the bit=1, a release is given, so that when there is a manual request to reduce the downforce, this reduction is actually implemented. If the bit=0, the request for a manual reduction of the downforce is not implemented.

The output value 34 represents a difference in aero balance delta AB, in other words a request to change the aero balance AB, for example by a value of between −26 and +15 relative to a mean AB value of 0, in other words, for example, a reduction in AB by 26% or an increase in AB by 15%. At the same time, the output value 34 provides a difference in downforce value delta downforce (DF) of 0 to 3000 N, for example, wherein the output value 34 combines these two values—difference in downforce value and difference in aero balance value—by means of a matrix into a value, so that only one value has to be output, which represents the values of difference in downforce value and difference in aero balance value.

Figure 4:
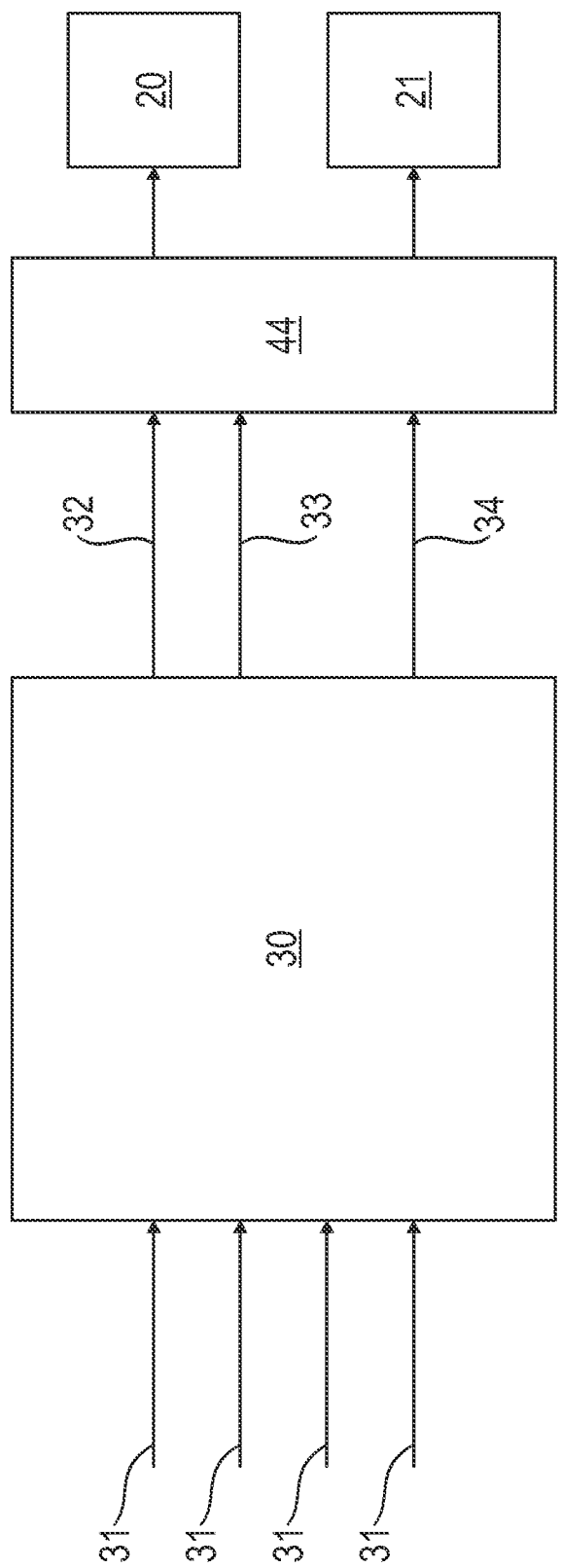
FIG. 4 shows a block diagram for explaining the motor vehicle according to aspects of the invention and the method according to aspects of the invention.
Figure 5:
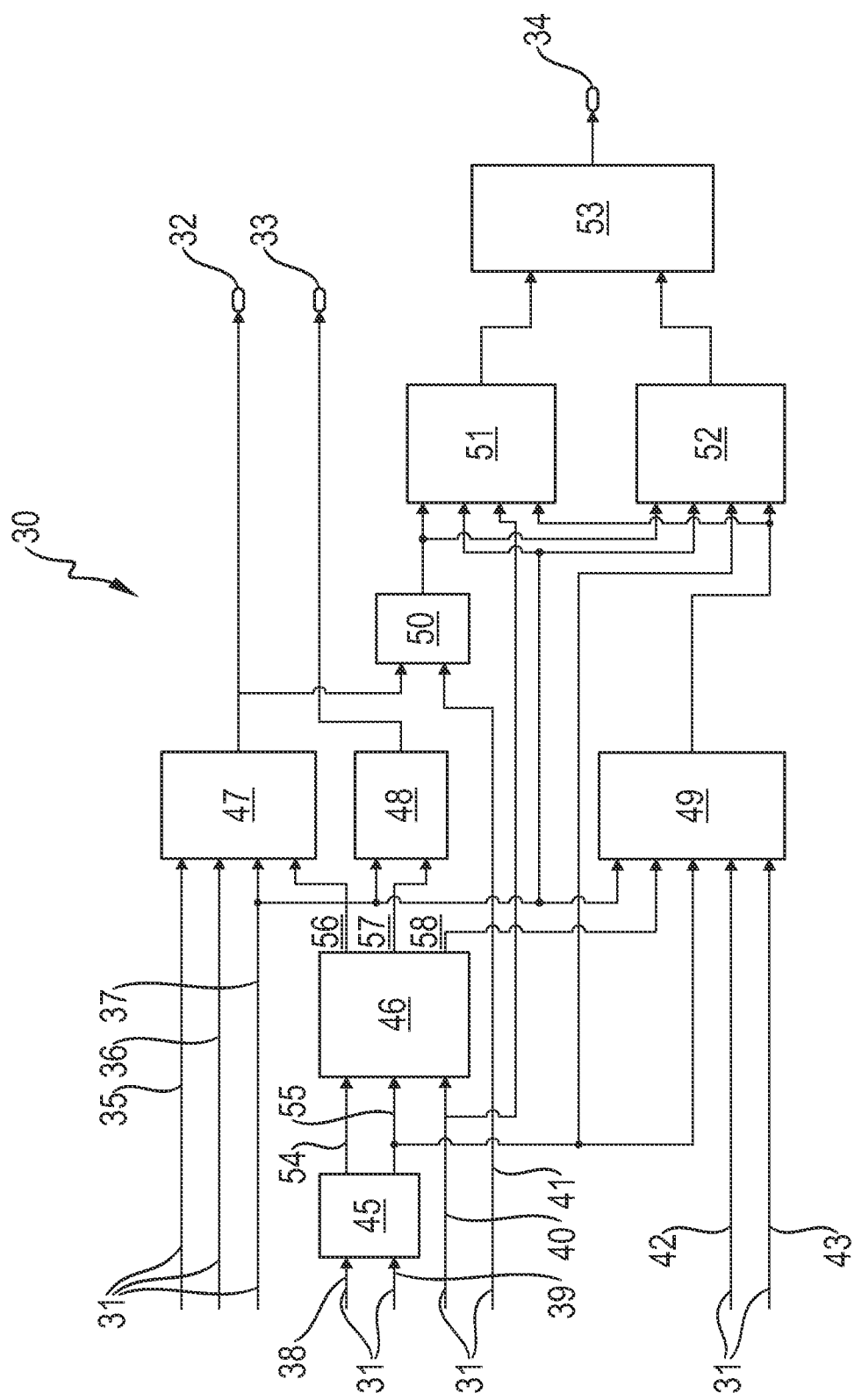
FIG. 5 shows a block diagram for explaining the motor vehicle according to aspects of the invention and the method according to aspects of the invention.

According to FIG. 4, the output values 32, 33 and 34 are processed with the unit for actuator activation 44 and the actuators 20 and 21 are therefore activated to adjust the front spoiler 6 and rear spoiler 7.

In block 45 there is a filtering of the read-in values of 38 and 39, for example a PT1 filtering, so that correspondingly filtered values and values 54, 55 with an optional adjustment of their algebraic sign are output.

In block 46 values 56, 57 and 58 are determined, in which the values 56, 57 are formed from quotients of 54 and 40 or 55 and 40, which represents the longitudinal acceleration depending on the coefficient of friction or the lateral acceleration depending on the coefficient of friction. An adjustment value 58 of the coefficient of friction is also determined.

Setting conditions and resetting conditions for automatic control are defined in block 47, for example as a function of the vehicle speed, the coefficient of friction, the gas pedal position, hump detection, etc.

In block 48 a release takes place depending on the lateral acceleration and as a function of the vehicle speed. DRS is only released when the motor vehicle exceeds a predefined speed and, in addition, remains below a predefined lateral acceleration threshold. The resetting is similar, but exposed to hysteresis, so that there is no constant switching back and forth.

Block 49 takes account of the signal delay and the inertia of the actuators 20, 21 and compensates for this accordingly.

Block 50 is used to define the actual state of the actuators 20, 21. In this case, the position of the front spoiler 6 and/or of the rear spoiler 7 can be determined from the internal signals and the available signal on the status of the spoiler.

Block 51 produces an aerodynamic balance delta, a difference in aero balance value, as a target variable, in particular in whole numbers as a percentage. It is taken into account in this case that a pitching of the body, or pitching behavior of the body, has a strong influence on the aero balance, so in particular during braking the downforce on the front axle 3 is increased and that on the rear axle 5 reduced. This means that the motor vehicle is substantially more agile than required, where appropriate. Accordingly, in order to counter this and depending on the delay, the pitching behavior can be adjusted, which can take place over measured spring travels or the calculated driver braking requirement, for example, or else the calculated or expected vehicle delay, and a corresponding influence can be exerted.

In block 52, the difference in downforce delta DF is determined as a function of the lateral acceleration and adjusted, in particular increased. This is used, for example, in order to keep wheel loads low in the driving dynamics range and to be able to increase the downforces when there are high lateral accelerations. The downforce DF can also be adjusted as a function of the longitudinal acceleration and/or the longitudinal deceleration. Values of between 0 and 3000 N can be output as the output value, for example, depending on the vehicle speed and/or the longitudinal acceleration values and/or the lateral acceleration.

Block 53 serves as the interface of modules 51 and 52 and combines the output values of blocks 51 and 52 into a matrix value which is output as value 34.

Accordingly, in the case of a motor vehicle 1 with an automatically adjustable front wing 6 and with an automatically adjustable rear wing 7, which can be adjusted by an actuator 20, 21 in a controlled manner in each case, it is provided that by means of the adjustment of the front wing 6 and/or by means of the adjustment of the rear wing 7, due to the inflow of air on the front axle 3, a downforce on said front axle (FDF), and due to the inflow of air on the rear axle 5, a downforce on said rear axle (RDF), can be adjusted, wherein a resulting downforce DF=(FDF+RDF) passing through a CoP point can be produced and an aero balance (AB) can be adjusted as AB=FDF/DF*100%. According to the theory underlying the invention, the downforce on the front axle (FDF), the downforce on the rear axle (RDF), the resulting downforce (DF), and/or the aero balance (AB) can be controlled and/or adjusted automatically and/or manually.

Hence, for example, the downforce on the front axle (FDF), the downforce on the rear axle (RDF), the resulting downforce (DF), and/or the aero balance (AB) can be automatically adjusted, depending on the dynamic driving state of the motor vehicle 1 with the help of data 31 on the motor vehicle 1.

It is also advantageous for the automatic adjustability of the downforce on the front axle (FDF), the downforce on the rear axle (RDF), the resulting downforce (DF), and/or the aero balance (AB) to be capable of being switched on manually or automatically, switched off manually or automatic, and/or manually overwritten at least temporarily.

In this way, the driver can exert manual influence, for example by means of the DRS button, in order to reduce the downforce, to reduce the air resistance, and to switch into Low Downforce (LDF) mode when this is released by the control unit 30. If this kind of manual DRS request takes place and it is released, the request is implemented and the downforce is reduced. If there is no release, the request is ignored and the downforce remains as it is. In this case, a change in LDF that has already been carried out by the DRS request is no longer reset, even after the release has been deleted. This is carried out exclusively by the driver himself by releasing the DRS button.

Accordingly, the manual ability to overwrite the adjustability of the downforce on the front axle (FDF), the downforce on the rear axle (RDF), the resulting downforce (DF), and/or the aero balance (AB) can only be allowed in first predefined dynamic driving states and/or in second predefined dynamic driving states. The control unit 30 determines whether the manual change by the driver, for example using the DRS button, with the help of the available data is allowed or prevented.

It is therefore also advantageous for the resulting downforce (DF) and/or the aero balance (AB) to be adjustable or to be adjusted, depending on at least one pitch angle, roll angle and/or yaw angle of the vehicle body and/or at least one pitch force, roll force and/or yaw force.

It is also advantageous for the resulting downforce (DF) to be adjustable, depending on at least one lateral acceleration of the motor vehicle, wherein particularly with a lateral acceleration smaller than a predefined limit value, the downforce is limited to a predefined value.

According to a further theory, control of the aero balance and the downforces on the front axle and on the rear axle is optionally taken in such a manner that substantially at each point in time, or at desired points in time, the aero balance is adjusted within its limits on account of the kinematics and the construction to its target aero balance value, irrespective of which downforce target values exist. The aero balance is therefore prioritized by comparison with the downforce. If the downforce cannot therefore be adjusted in such a manner that its target values are reached on the front axle and on the rear axle because, for example, limits on the adjustment of the front wing or the rear wing are reached, the respective downforce is nevertheless adjusted in such a manner that the target value of the aero balance is reached.

In this case, with an adjustment from a low downforce to a higher downforce, the downforce coefficient on the front axle is preferably adjusted to begin with, in other words the front wing is initially adjusted, wherein the target values of the aero balance are maintained during the adjustment process. Once the front wing has arrived at the end of the adjustment range, the rear wing is then adjusted, so that the target downforce values can be achieved where possible, while the target values of the aero balance continue to be observed during the further adjustment process.

It is furthermore preferred during an adjustment from a higher downforce to a lower downforce, for the downforce coefficient on the rear axial to be adjusted to begin with, in other words for the rear wing to be initially adjusted, wherein the target values of the aero balance are maintained during the adjustment process. Once the rear wing has arrived at the end of the adjustment range, the front wing is then adjusted, so that the target downforce values can be achieved where possible, while the target values of the aero balance continue to be observed during the further adjustment process.

LIST OF REFERENCE SIGNS 1 motor vehicle
2 front wheel
3 front axle
4 rear wheel
5 rear axle
6 front wing/front spoiler
7 rear wing/rear spoiler
8 means
9 means
10 underbody
20 actuator
21 actuator
30 control unit
31 data/input variables
32 output value
33 output value
34 output value
35 Kupp-state
36 Trottle-pos
37 VFzRef
38 Ays
39 Axs
40 MueMax
41 SpoilerSG_Status
42 MPropDrvReq
43 MbDrvLdmReq
44 actuator actuation
45 block
46 block
47 block
48 block
49 block
50 block
51 block
52 block
53 block
54 value
55 value
56 value
57 value
58 value/adjustment

What is claimed is:

1. A motor vehicle comprising:
an automatically adjustable front wing and an automatically adjustable rear wing, which are each adjustable in a controlled manner by respective actuators, and
a front axle with front wheels and a rear axle with rear wheels,
wherein adjustment of the front wing and/or the rear wing changes a downforce (FDF) on said front axle due to an inflow of air onto the front axle, and changes a downforce (RDF) on said rear axle due to the inflow of air onto the rear axle,
wherein a resulting downforce (DF=FDF+RDF) passing through a point (CoP) is produced, and an aero balance (AB) is adjusted according to an equation AB=FDF/DF*100%,
wherein the downforce on the front axle (FDF), the downforce on the rear axle (RDF), the resulting downforce (DF), and/or the aero balance (AB) is/are controlled and/or adjusted automatically by a control unit,
wherein the aero balance (AB) is manually adjusted,
wherein an ability to manually adjust the aero balance (AB) is allowed in a first predefined dynamic driving state and is prohibited in a second predefined dynamic driving state that differs from the first predefined dynamic driving state,
wherein the ability to manually adjust the aero balance (AB) is permitted when a speed of the vehicle is greater than a predefined speed threshold, and a lateral acceleration of the vehicle is less than a predefined lateral acceleration threshold.

2. The motor vehicle as claimed in claim 1, wherein the downforce on the front axle (FDF), the downforce on the rear axle (RDF), the resulting downforce (DF), and/or the aero balance (AB) is/are automatically adjustable, depending on a dynamic driving state of the motor vehicle.

3. The motor vehicle as claimed in claim 2, wherein the automatic adjustability of the downforce on the front axle (FDF), the downforce on the rear axle (RDF), the resulting downforce (DF), and/or the aero balance (AB) can be switched on manually or automatically, switched off manually or automatically, and/or manually overwritten at least temporarily.

4. The motor vehicle as claimed in claim 1, wherein the resulting downforce (DF) and/or the aero balance (AB) is/are adjustable, depending on at least one pitch angle, roll angle and/or yaw angle of a body of the vehicle and/or at least one pitch force, roll force and/or yaw force.

5. The motor vehicle as claimed in claim 1, wherein the resulting downforce (DF) is adjustable depending on at least one lateral acceleration of the motor vehicle.

6. The motor vehicle as claimed in claim 5, wherein the resulting downforce is reduced to a predefined value when a lateral acceleration experienced by the vehicle is smaller than the predefined lateral acceleration threshold.

7. The motor vehicle of claim 1, wherein the control unit is configured to (i) identify that a current dynamic driving state of the motor vehicle is one of the first or second predefined dynamic driving states based on vehicle data, dynamic driving data, and/or sensor data and (ii) adjust the aero balance (AB) based upon the identified current dynamic driving state.

8. The motor vehicle of claim 1, wherein the control unit is configured to either activate or deactivate automatic control of the downforce on the front axle (FDF), the downforce on the rear axle (RDF), the resulting downforce (DF), and/or the aero balance (AB), depending upon a vehicle mode affecting a drivetrain of the vehicle that is set by a user of the motor vehicle, the vehicle mode comprising a sport mode and a normal mode.

9. The motor vehicle as claimed in claim 1, wherein in the first predefined dynamic driving state, manually adjusting the aero balance by an operator of the motor vehicle would not result in a downforce applied to either the front axle and/or the rear axle that is less than a predetermined required downforce on the front axle and/or the rear axle, and
wherein in the second predefined dynamic driving state, manually adjusting the aero balance by the operator of the motor vehicle would result in a downforce applied to either the front axle and/or the rear axle that is less than the predetermined required downforce on the front axle and/or the rear axle.

10. A method for controlling an aero balance (AB) and/or a resulting downforce (DF) of a motor vehicle having (i) an automatically adjustable front wing and an automatically adjustable rear wing, which are each adjustable in a controlled manner by respective actuators, (ii) a front axle with front wheels, and (iii) a rear axle with rear wheels, said method comprising:

adjusting a downforce (FDF) on said front axle due to an inflow of air onto the front axle and adjusting a downforce (RDF) on said rear axle due to the inflow of air onto the rear axle by adjusting the front wing and/or the rear wing, wherein the aero balance (AB) is adjusted according to an equation AB=FDF/DF*100%, where the resulting downforce DF=(FDF+RDF) passing through a point (CoP), and automatically controlling and/or adjusting the downforce on the front axle (FDF), the downforce on the rear axle (RDF), the resulting downforce (DF) and/or the aero balance (AB), manually adjusting the aero balance (AB), wherein an ability to manually adjust the aero balance (AB) is allowed in a first predefined dynamic driving state and is prohibited in a second predefined dynamic driving state that differs from the first predefined dynamic driving state, wherein, when adjusting to a higher downforce, the downforce (RDF) on said rear axle is adjusted prior to adjusting the downforce (FDF) on said front axle.

11. The method as claimed in claim 10, wherein the downforce on the front axle (FDF), the downforce on the rear axle (RDF), the resulting downforce (DF), and/or the aero balance (AB) is controlled automatically, depending on a dynamic driving state of the motor vehicle.

12. The method as claimed in claim 11, wherein the automatic adjustability of the downforce on the front axle (FDF), the downforce on the rear axle (RDF), the resulting downforce (DF), and/or the aero balance (AB) is capable of being switched on manually or automatically, switched off manually or automatically, and/or manually overwritten at least temporarily.

13. The method as claimed in claim 10, wherein the resulting downforce (DF) and/or the aero balance (AB) is or are adjustable depending on at least one pitch angle, roll angle and/or yaw angle of a body of the vehicle and/or at least one pitch force, roll force and/or yaw force.

14. The method as claimed in claim 10, wherein the resulting downforce (DF) is adjustable depending on at least one lateral acceleration of the motor vehicle.

15. The method of claim 14, wherein the downforce is reduced to a predefined value when a lateral acceleration experienced by the vehicle is smaller than a predefined limit value.

16. The method of claim 10, wherein the downforce on the front axle (FDF), the downforce on the rear axle (RDF), the resulting downforce (DF), and/or the aero balance (AB) is controlled automatically by a control unit.

17. The method of claim 16, wherein the control unit is configured to (i) identify that a current dynamic driving state of the motor vehicle is one of the first and second predefined dynamic driving states based on vehicle data, dynamic driving data, and/or sensor data and (ii) adjust the aero balance (AB) based upon the identified current dynamic driving state.

18. A method for controlling an aero balance (AB) and/or a resulting downforce (DF) of a motor vehicle having (i) an automatically adjustable front wing and an automatically adjustable rear wing, which are each adjustable in a controlled manner by respective actuators, (ii) a front axle with front wheels, and (iii) a rear axle with rear wheels, said method comprising:

adjusting a downforce (FDF) on said front axle due to an inflow of air onto the front axle and adjusting a downforce (RDF) on said rear axle due to the inflow of air onto the rear axle by adjusting the front wing and/or the rear wing, wherein the aero balance (AB) is adjusted according to an equation AB=FDF/DF*100%, where the resulting downforce DF=(FDF+RDF) passing through a point (CoP), and automatically controlling and/or adjusting the downforce on the front axle (FDF), the downforce on the rear axle (RDF), the resulting downforce (DF) and/or the aero balance (AB), manually adjusting the aero balance (AB), wherein an ability to manually adjust the aero balance (AB) is allowed in a first predefined dynamic driving state and is prohibited in a second predefined dynamic driving state that differs from the first predefined dynamic driving state, wherein the downforce on the front axle (FDF), the downforce on the rear axle (RDF), the resulting downforce (DF), and/or the aero balance (AB) is controlled automatically by a control unit, wherein the control unit is configured to either activate or deactivate automatic control of the aero balance (AB), depending upon a vehicle mode affecting a drivetrain of the vehicle that is set by a user of the motor vehicle, the vehicle mode comprising a sport mode and a normal mode.

* * * * *